(12) United States Patent
Chow

(10) Patent No.: US 7,079,190 B2
(45) Date of Patent: Jul. 18, 2006

(54) TECHNIQUE FOR DETERMINING THE SLOPE OF A FIELD PIXEL

(75) Inventor: Wing-Chi Chow, Toronto (CA)

(73) Assignee: Zoran Corporation, Sunnyvale, CA (US)

( * ) Notice: Subject to any disclaimer, the term of this patent is extended or adjusted under 35 U.S.C. 154(b) by 644 days.

(21) Appl. No.: 10/033,219

(22) Filed: Dec. 27, 2001

(65) Prior Publication Data

US 2003/0123753 A1   Jul. 3, 2003

(51) Int. Cl.
*H04N 7/01* (2006.01)

(52) U.S. Cl. .................................................. 348/448
(58) Field of Classification Search ......... 348/625–631
See application file for complete search history.

(56) References Cited

U.S. PATENT DOCUMENTS

| 6,104,753 | A  | * | 8/2000  | Kim et al. ............. 375/240.16 |
| 6,141,056 | A  | * | 10/2000 | Westerman ................. 348/448 |
| 6,239,847 | B1 | * | 5/2001  | Deierling .................... 348/581 |
| 6,262,773 | B1 |   | 7/2001  | Westerman |
| 6,295,091 | B1 |   | 9/2001  | Huang |
| 6,377,313 | B1 | * | 4/2002  | Yang et al. .................. 348/630 |
| 6,380,978 | B1 | * | 4/2002  | Adams et al. .............. 348/452 |
| 6,501,507 | B1 | * | 12/2002 | Canfield ..................... 348/441 |
| 6,573,940 | B1 | * | 6/2003  | Yang .......................... 348/441 |
| 6,587,158 | B1 | * | 7/2003  | Adams et al. .............. 348/716 |
| 6,614,474 | B1 | * | 9/2003  | Malkin et al. .............. 348/252 |
| 6,647,061 | B1 | * | 11/2003 | Panusopone et al. .. 375/240.12 |
| 6,680,752 | B1 | * | 1/2004  | Callway et al. ............. 348/448 |
| 6,864,923 | B1 | * | 3/2005  | Minami ...................... 348/625 |
| 2004/0028292 | A1 | * | 2/2004 | Alm et al. ................... 382/298 |

\* cited by examiner

*Primary Examiner*—Paulos M. Natnael
(74) *Attorney, Agent, or Firm*—Parsons Hsue & de Runtz LLP

(57) ABSTRACT

A technique for determining the slope of a field pixel is described. According to the technique, one or more sets of diagonal field pixels are downscaled (or downsampled) before they are provided to respective edge detector circuits. By downscaling the sets of diagonal field pixels before they are provided to respective detector circuits, the edge detector circuits detect diagonal edges and, in particular, shallow diagonal edges with greater accuracy. As such, the slopes assigned to the field pixels are more likely to be correct. This ultimately results in a high quality progressive video signal that can be used to generate an image that is completely or substantially free from objectionable artifacts.

13 Claims, 2 Drawing Sheets

FIG. 1

TECHNIQUE FOR DETERMINING THE SLOPE OF A FIELD PIXEL

BACKGROUND

1. Field of the Invention

The present invention relates to video signal processing and, more particularly, to a technique for determining the slopes of field pixels. The technique of the present invention can, for example, be used to generate interpolated pixels when converting an interlaced video signal into a progressive video signal or when scaling (enlarging) any type of image.

2. Related Art

There are two common types of video display systems: interlaced display systems and progressive display systems. Interlaced display systems use interlaced video signals. An interlaced video signal includes even fields, which contain one half of the total lines displayed, and odd fields, which contain one half of the total lines displayed. The even fields and the odd fields of the interlaced video signal are alternately scanned onto the display to generate an image. By contrast, progressive display systems use progressive video signals. A progressive video signal includes a single frame, which contains all of the total lines displayed. The lines of the progressive video signal are successively scanned onto the display to generate an image.

Progressive display systems are becoming increasingly popular since they produce a higher quality image compared to interlaced display systems. However, many video signals that exist today are interlaced video signals. Thus to display the interlaced video signals on a progressive display system, the interlaced video signal must be converted into a progressive video signal. This conversion process is known as video deinterlacing.

Two common video deinterlacing techniques are known as the merging technique and the interpolation technique. According to the merging technique, the lines of the even and odd fields are interleaved (or merged) to generate a single frame. The merging technique is well suited for relatively static images, but produces highly objectionable artifacts when significant motion is present in the image. According to the interpolation technique, the interpolated lines (i.e., the missing lines) between the field lines are generated (usually by averaging the field pixels in the field lines above and below each interpolated line) and combined with the field lines to generate a single frame. The interpolation technique is well suited for video with high motion content, but produces a clearly visible loss of vertical resolution for relatively static images.

Many different interpolation techniques are known. According to one known interpolation technique, the so-called vertical interpolation technique, an interpolated pixel (i.e., a pixel in an interpolated line) is generated using an average of the field pixel positioned immediately above and the field pixel positioned immediately below the interpolated pixel. Typically, both the luma and chroma components of the field pixels are averaged by taking 50% of the field pixel positioned immediately above and 50% of the pixel positioned immediately below the interpolated pixel. This technique works fairly well when the interpolated pixel is on a horizontal or vertical edge. However, when the interpolated pixel is on a diagonal edge, this technique produces highly objectionable artifacts (i.e., jagged edges). The term "edge" refers to a line or other like feature that is part of the displayed image.

According to another known interpolation technique, the so-called diagonal interpolation technique, an interpolated pixel is generated by the following process. First, the slopes of field pixels that are positioned vertically and diagonally relative to the interpolated pixel are determined. To determine the slope of a field pixel, a set of horizontal field pixels (positioned relative to the field pixel whose slope is currently being determined), a set of vertical field pixels (positioned relative to the field pixel whose slope is currently being determined), and one or more sets of diagonal field pixels (positioned relative to the field pixel whose slope is currently being determined) are provided to respective edge detector circuits. Each edge detector circuit detects an edge having a specific slope (e.g., a 0 degree edge detector circuit detects horizontal edges, a +63.4 degree edge detector circuit detects +63.4 degree edges, and a −63.4 degree edge detector circuit detects −63.4 degree edges). Typically, only one of the edge detector circuits (if any) will detect an edge and will output a value indicating that an edge has been detected. The slope of the field pixel whose slope is being determined is then assigned the slope of the detected edge. This same process is used to determine the slopes of all of the pixels that are positioned vertically and diagonally relative to the interpolated pixels.

Second, the interpolated pixels are generated based on the slopes of field pixels that are positioned vertically and diagonally relative to the interpolated pixels. To generate an interpolated pixel, the slopes of a set of vertical field pixels and the slopes of multiple sets of diagonal field pixels that surround the interpolated pixel are examined to determine which set (if any) indicates a horizontal, a vertical, or a diagonal edge. If the field pixels within the same set have the same slope, then the field pixel whose slope is being determined is assigned this slope. If the field pixels within the same set do not have the same slope, then the field pixel whose slope is being determined is not assigned this slope. The same process is used to determine the slope of all of the interpolated pixels. The interpolated pixels and the field pixels can then be combined to generate a progressive video signal.

One problem with the diagonal interpolation technique is that the slopes of field pixels are often determined incorrectly. This is because the diagonal edge detector circuits and, in particular, the shallow diagonal edge detector circuits often falsely detect an edge. In other words, the output of the shallow edge detector circuits indicate that a field pixel has a particular slope when, in fact, the field pixel does not have this slope. Those of ordinary skill in the art will recognize that this problem is primarily due to high frequency luma noise which creates aliases. Since the slopes of the interpolated pixels are determined by examining the slopes of the field pixels, and some of the field pixels have incorrectly determined slopes, the values of some of the interpolated pixels will be generated incorrectly. Consequently, the resulting progressive scan video signal produces an image that includes highly objectionable artifacts (i.e., jagged edges).

Accordingly, what is needed is an improved technique for determining the slope of a field pixel.

SUMMARY

The present invention provides an improved technique for determining the slope of a field pixel. According to the technique of the present invention, one or more sets of diagonal field pixels are downscaled (or downsampled) before they are provided to respective edge detector circuits.

By downscaling the sets of diagonal field pixels before they are provided to respective edge detector circuits, the edge detector circuits detect diagonal edges and, in particular shallow diagonal edges, with greater accuracy. As such, the slopes assigned to the field pixels are more likely to be correct. This ultimately results in a high quality progressive video signal that can be used to generate an image that is completely or substantially free from objectionable artifacts.

Other embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings in which:

FIG. 1 shows a pixel array having field lines and interpolated lines. The field lines are part of an interlaced video signal, and the interpolated lines are generated using the field lines.

DETAILED DESCRIPTION

Figure 1:
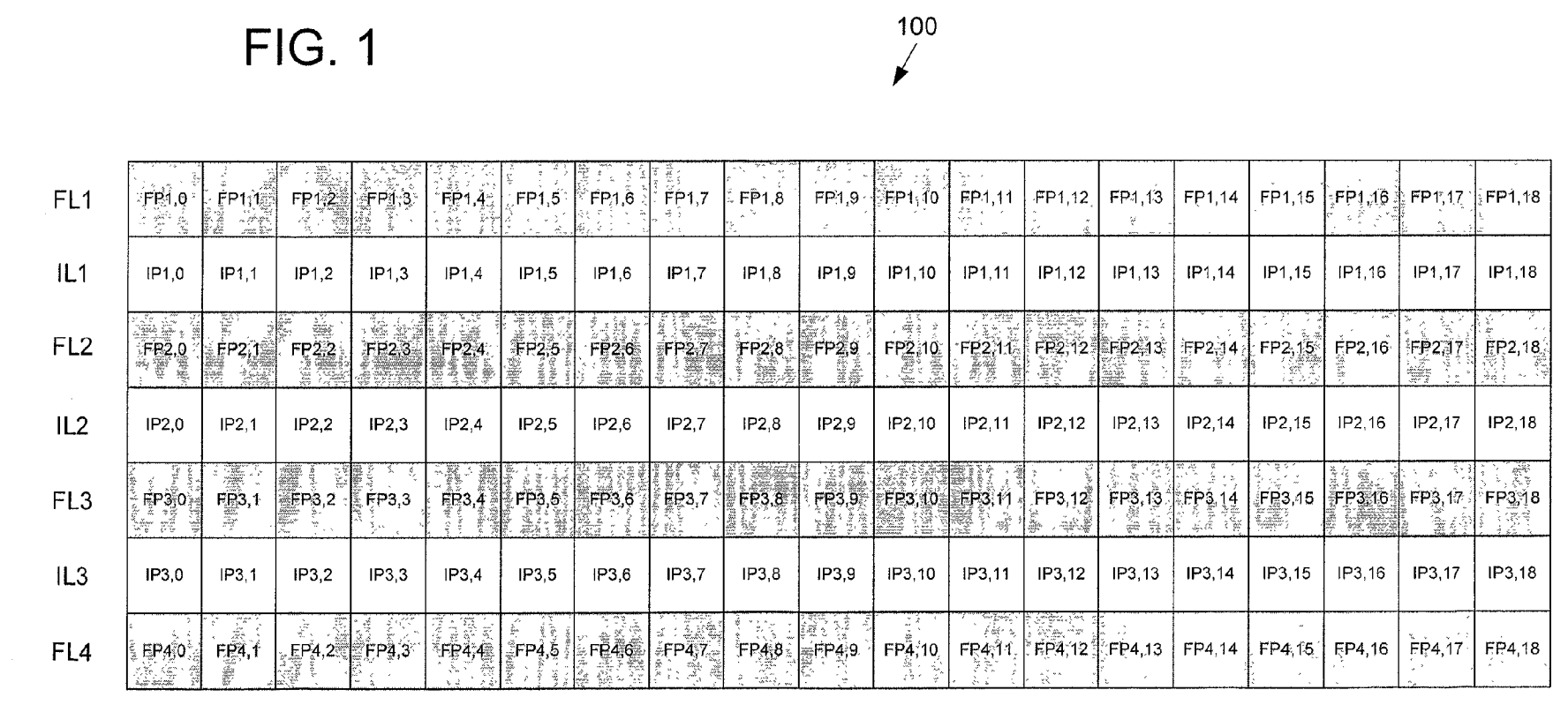
Figure 2:
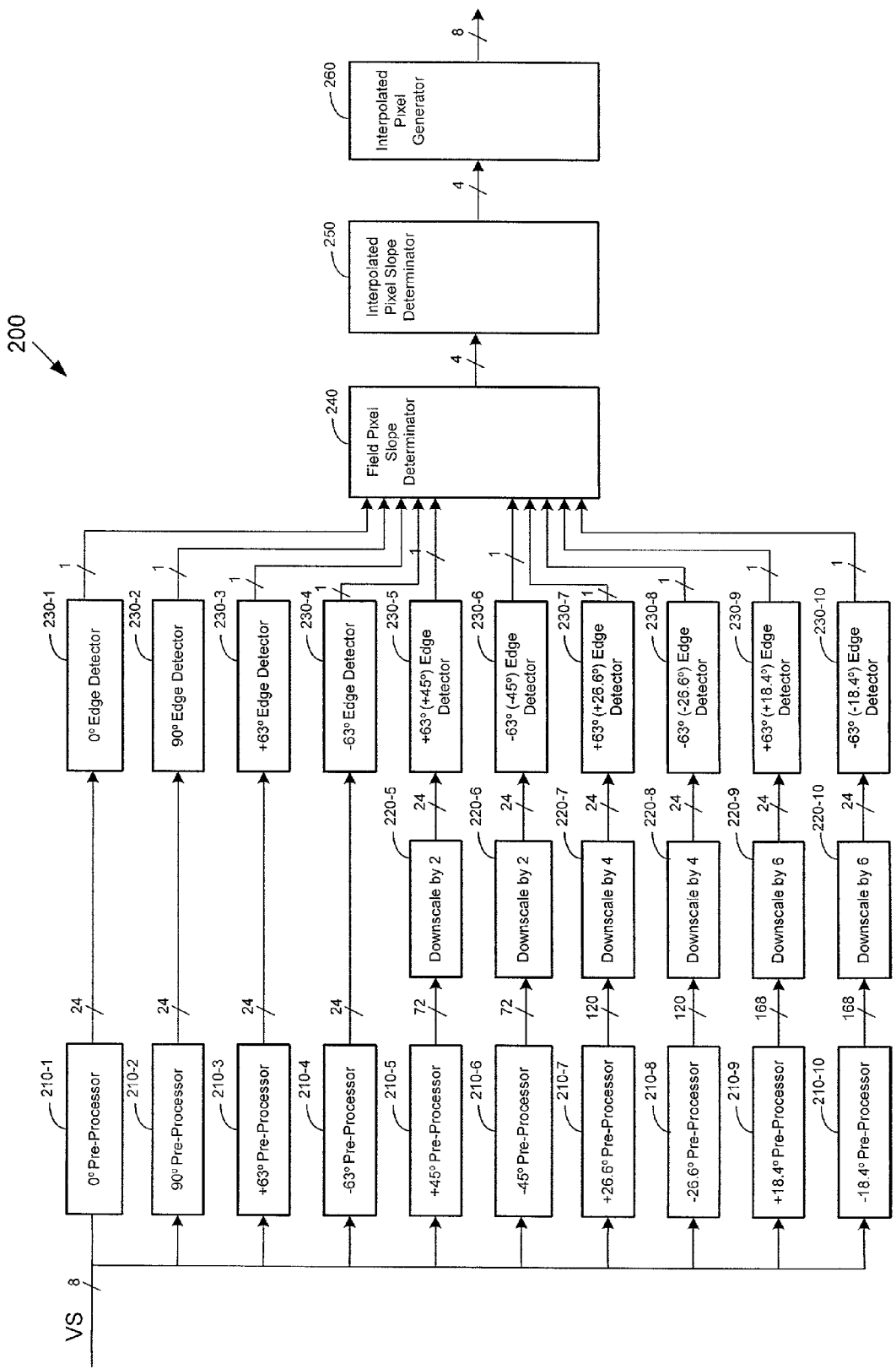
FIG. 2 is a block diagram of a diagonal interpolator circuit, according to some embodiments of the present invention.

The preferred embodiments of the present invention and their advantages are best understood by referring to FIGS. 1 through 2 of the drawings. Like reference numerals are used for like and corresponding parts of the various drawings.

Pixel Array

FIG. 1 shows a pixel array 100. Pixel array 100 includes field lines FL1, FL2, FL3, and FL4 and interpolated lines IL1, IL2, and IL3. Field lines FL1, FL2, FL3, and FL4 are from the same field (i.e., an even field or an odd field) of an interlaced video signal. Interpolated lines IL1, IL2, and IL3 are not part of the interlaced video signal. Rather, interpolated lines IL1, IL2, and IL3 are generated using field pixels (described below) from field lines FL1, FL2, FL3, and/or FL4. For example, interpolated line IL2 can be generated using field pixels in field line FL2 and field pixels in field line FL3.

Field lines FL1, FL2, FL3, and FL4 each include a plurality of field pixels. Field line L1 includes field pixels FP1,0 through FP1,18, field line FL2 includes field pixels FP2,0 through FP2,18, field line FL3 includes field pixels FP3,0 through FP3,18, and field line FL4 includes field pixels FP4,0 through FP4,18. Each field pixel is typically represented by an 8-bit luma component, which includes black and white information, and an 8-bit chroma component, which includes color information. The present invention can be used, however, with field pixels that are represented by any number of bits. Note that 8-bit luma and chroma components are typically used for consumer-grade electronics equipment whereas 10-bit luma and chroma components are commonly used for professional-grade (studio quality) electronics equipment.

Interpolated lines IL1, IL2, and IL3 each include a plurality of interpolated pixels. Interpolated line IL1 includes interpolated pixels IP1,0 through IP1,18, interpolated line IL2 includes interpolated pixels IP2,0 through IP2,18, and interpolated line IL3 includes interpolated pixels IP3,0 through IP3,18. The interpolated pixel can be represented by an 8-bit luma component and/or an 8-bit chroma component.

It should be recognized that FIG. 1 only shows a small portion of an actual pixel array. Typically, there are hundreds of field lines and hundreds of interpolated lines (e.g., 240 field lines and 240 interpolated lines) in the pixel array, and there are typically hundreds of field pixels (e.g., 720 field pixels) in each field line and each interpolated line.

Diagonal Interpolator Circuit

FIG. 2 is a block diagram of an exemplary diagonal interpolator circuit 200, according to some embodiments of the present invention. The purpose of diagonal interpolator circuit 200 is to determine the slopes of the field pixels and then use the determined slopes of the field pixels to generate interpolated pixels. The interpolated pixels can then, for example, be combined with the field pixels to generate a progressive video signal.

Diagonal interpolator circuit 200 uses a novel horizontal downscaling technique when determining the slopes of the field pixels. According to this horizontal downscaling technique, one or more sets of diagonal field pixels are downscaled before they are provided to respective edge detector circuits. By downscaling the sets of diagonal field pixels before they are provided to respective edge detector circuits, the edge detector circuits detect diagonal edges and, in particular shallow diagonal edges, with greater accuracy. As such, the slopes assigned to the field pixels are more likely to be correct. This ultimately results in a high quality progressive video signal that can be used to generate an image that is completely or substantially free from objectionable artifacts.

Diagonal interpolator 200 includes multiple pre-processor circuits 210 (separately labeled 210-1 through 210-10), multiple horizontal downscale circuits 220 (separately labeled 220-5 through 220-10), multiple detector circuits 230 (separately labeled 230-1 through 230-10), a field pixel slope determinator circuit 240, an interpolated pixel slope determinator circuit 250, and an interpolated pixel generator circuit 260. Diagonal interpolator circuit 200 can be implemented in hardware, firmware/microcode, software, or any combination thereof and can be implemented in an integrated circuit device. Reference is made to pixel array 100 of FIG. 1 when describing the operation of diagonal interpolator circuit 200.

Pre-Processor Circuits

Each pre-processor circuit 210 is coupled to receive an interlaced video signal VS. Interlaced video signal VS is a digital signal that includes a stream of field pixels that are received sequentially by each pre-processor circuit 210. For example, field pixel FP1,0 is the first pixel received, field pixel FP1,1 is the second pixel received, ... , field pixel FP2,0 is the $20^{th}$ pixel received, field pixel FP2,1 is the $21^{st}$ pixel received, and so on. As described above, each field pixel typically includes an 8-bit luma component and an 8-bit chroma component. Since the slope of a field pixel can be determined using the 8-bit luma components of the field pixels, each preprocessor circuit 210 only outputs the 8-bit luma components of the field pixels. However, it should be recognized that the 8-bit luma components and/or the 8-bit chroma components of the field pixels can be used to determine the slope of a field pixel by making appropriate modifications to diagonal interpolator circuit 200.

0 degree pre-processor circuit 210-1 receives the interlaced video signal VS that includes the field pixels, temporarily stores the field pixels, and outputs 3 field pixels to 0 degree edge detector circuit 230-1. The 3 field pixels include the field pixel whose slope is currently being determined and the two field pixels that are positioned at a 0 degree angle relative to the field pixel whose slope is currently being determined. For example, if field pixel FP2,9 is the field pixel whose slope is currently being determined, pre-processor circuit 210-1 outputs the 8-bit luma component of field pixel FP2,9 and the 8-bit luma components of field pixels FP2,8 and FP2,10.

90 degree pre-processor circuit 210-2 receives the interlaced video signal VS that includes the field pixels, temporarily stores the field pixels, and outputs 3 field pixels to 90 degree edge detector circuit 230-2. The 3 field pixels include the field pixel whose slope is currently being determined and the two field pixels that are positioned at a 90 degree angle relative to the field pixel whose slope is currently being determined. For example, if field pixel FP2,9 is the field pixel whose slope is currently being determined, pre-processor circuit 210-2 outputs the 8-bit luma component of field pixel FP2,9 and the 8-bit luma components of field pixels FP1,9 and FP3,9.

+63.4 degree pre-processor circuit 210-3 receives the interlaced video signal VS that includes the field pixels, temporarily stores the field pixels, and outputs 3 field pixels to +63.4 degree edge detector circuit 230-3. The 3 field pixels include the field pixel whose slope is currently being determined and the two field pixels that are positioned at a +63.4 degree angle relative to the field pixel whose slope is currently being determined. For example, if field pixel FP2,9 is the field pixel whose slope is currently being determined, pre-processor circuit 210-3 outputs the 8-bit luma component of field pixel FP2,9 and the 8-bit luma components of field pixels FP1,10 and FP3,8.

−63.4 degree pre-processor circuit 210-4 receives the interlaced video signal VS that includes the field pixels, temporarily stores the field pixels, and outputs 3 field pixels to −63.4 degree edge detector circuit 230-4. The 3 field pixels include the field pixel whose slope is currently being determined and the two field pixels that are positioned at a −63.4 degree angle relative to the field pixel whose slope is currently being determined. For example, if field pixel FP2,9 is the field pixel whose slope is currently being determined, pre-processor circuit 210-4 outputs the 8-bit luma component of field pixel FP2,9 and the 8-bit luma components of field pixels FP1,8 and FP3,10.

+45 degree pre-processor circuit 210-5 receives the interlaced video signal VS that includes the field pixels, temporarily stores the field pixels, and outputs a first set of 3 field pixels, a second set of 3 field pixels, and a third set of 3 field pixels to horizontal downscale by 2 circuit 220-5. The first set of 3 field pixels includes the pixel whose slope is currently being determined and the field pixels on both sides of this field pixel. The second set of 3 field pixels includes the field pixel in the line above the field pixel whose slope is being determined that is positioned at a +45 degree angle relative to the field pixel whose slope is currently being determined and the field pixels on both sides of this field pixel. The third set of 3 field pixels includes the field pixel in the line below the field pixel whose slope is being determined that is positioned at a +45 degree angle relative to the field pixel whose slope is currently being determined and the field pixels on both sides of this field pixel. For example, if field pixel FP2,9 is the field pixel whose slope is currently being determined, pre-processor circuit 210-5 outputs the 8-bit luma components of field pixels FP2,8, FP2,9, and FP2,10 (i.e., the first set of 3 field pixels), the 8-bit components of field pixels FP1,10, FP1,11, and FP1,12 (i.e., the second set of 3 field pixels), and the 8-bit components of field pixels FP3,6, FP3,7, and FP3,8 (i.e., the third set of 3 field pixels).

−45 degree pre-processor circuit 210-6 receives the interlaced video signal VS that includes the field pixels, temporarily stores the field pixels, and outputs a first set of 3 field pixels, a second set of 3 field pixels, and a third set of 3 field pixels to horizontal downscale by 2 circuit 220-6. The first set of 3 field pixels includes the pixel whose slope is currently being determined and the field pixels on both sides of this field pixel. The second set of 3 field pixels includes the field pixel in the line above the field pixel whose slope is being determined that is positioned at a −45 degree angle relative to the field pixel whose slope is currently being determined and the field pixels on both sides of this field pixel. The third set of 3 field pixels includes the field pixel in the line below the field pixel whose slope is being determined that is positioned at a −45 degree angle relative to the field pixel whose slope is currently being determined and the field pixels on both sides of this field pixel. For example, if field pixel FP2,9 is the field pixel whose slope is currently being determined, pre-processor circuit 210-6 outputs the 8-bit luma components of field pixels FP2,8, FP2,9, and FP2,10 (i.e., the first set of 3 field pixels), the 8-bit luma components of field pixels FP1,6, FP1,7, and FP1,8 (i.e., the second set of 3 field pixels), and the 8-bit luma components of field pixels FP3,10, FP3,11, and FP3,12 (i.e., the third set of 3 field pixels).

+26.6 degree pre-processor circuit 210-7 receives the interlaced video signal VS that includes the field pixels, temporarily stores the field pixels, and outputs a first set of 5 field pixels, a second set of 5 field pixels, and a third set of 5 field pixels to horizontal downscale by 4 circuit 220-7. The first set of 5 field pixels includes the pixel whose slope is currently being determined and the two field pixels on both sides of this field pixel. The second set of 5 field pixels includes the field pixel in the line above the field pixel whose slope is being determined that is positioned at a +26.6 degree angle relative to the field pixel whose slope is currently being determined and the two field pixels on both sides of this field pixel. The third set of 5 field pixels includes the field pixel in the line below the field pixel whose slope is being determined that is positioned at a +26.6 degree angle relative to the field pixel whose slope is currently being determined and the two field pixels on both sides of this field pixel. For example, if field pixel FP2,9 is the field pixel whose slope is currently being determined, pre-processor circuit 210-7 outputs the 8-bit luma components of field pixels FP2,7, FP2,8, FP2,9, FP2,10, and FP2,11 (i.e., the first set of 5 field pixels), the 8-bit luma components of field pixels FP1,11, FP1,12, FP1,13, FP1,14, and FP15 (i.e., the second set of 5 field pixels), and the 8-bit luma components of field pixels FP3,3, FP3,4, FP3,5, FP3,6, and FP3,7 (i.e., the third set of 5 field pixels).

−26.6 degree pre-processor circuit 210-8 receives the interlaced video signal VS that includes the field pixels, temporarily stores the field pixels, and outputs a first set of 5 field pixels, a second set of 5 field pixels, and a third set of 5 field pixels to horizontal downscale by 4 circuit 220-8. The first set of 5 field pixels includes the pixel whose slope is currently being determined and the two field pixels on both sides of this field pixel. The second set of 5 field pixels includes the field pixel in the line above the field pixel whose slope is being determined that is positioned at a −26.6 degree angle relative to the field pixel whose slope is currently being determined and the two field pixels on both sides of this field pixel. The third set of 5 field pixels includes the field pixel in the line below the field pixel whose slope is being determined that is positioned at a −26.6 degree angle relative to the field pixel whose slope is currently being determined and the two field pixels on both sides of this field pixel. For example, if field pixel FP2,9 is the field pixel whose slope is currently being determined, pre-processor circuit 210-8 outputs the 8-bit luma components of field pixels FP2,7, FP2,8, FP2,9, FP2,10, and FP2,11 (i.e., the first set of 5 field pixels), the 8-bit luma components of field pixels FP1,3, FP1,4, FP1,5, FP1,6, and FP1,7 (i.e., the second set of 5 field pixels) and the 8-bit luma components of field pixels FP3,11, FP3,12, FP3,13, FP3,14, and FP3,15 (i.e., the third set of 5 field pixels).

+18.4 degree pre-processor circuit 210-9 receives the interlaced video signal VS that includes the field pixels, temporarily stores the field pixels, and outputs a first set of 7 field pixels, a second set of 7 field pixels, and a third set of 7 field pixels to horizontal downscale by 6 circuit 220-9. The first set of 7 field pixels includes the pixel whose slope is currently being determined and the three field pixels on both sides of this field pixel. The second set of 7 field pixels includes the field pixel in the line above the field pixel whose slope is being determined that is positioned at a +18.4 degree angle relative to the field pixel whose slope is currently being determined and the three field pixels on both sides of this field pixel. The third set of 7 field pixels includes the field pixel in the line below the field pixel whose slope is being determined that is positioned at a +18.4 degree angle relative to the field pixel whose slope is currently being determined and the three field pixels on both sides of this field pixel. For example, if field pixel FP2,9 is the field pixel whose slope is currently being determined, pre-processor circuit 210-9 outputs the 8-bit luma components of field pixels FP2,6, FP2,7, FP2,8, FP2,9, FP2,10, FP2,11, and FP2,12 (i.e., the first set of 7 field pixels), the 8-bit luma components of field pixels FP1,12, FP1,13, FP1,14, FP1,15, FP1,16, FP1,17, and FP1,18 (i.e., the second set of 7 field pixels), and the 8-bit luma components of field pixels FP3,0, FP3,1, FP3,2, FP3,3, FP3,4, FP3,5, and FP3,6 (i.e., the third set of 7 field pixels).

−18.4 degree pre-processor circuit 210-10 receives the interlaced video signal VS that includes the field pixels, temporarily stores the field pixels, and outputs a first set of 7 field pixels, a second set of 7 field pixels, and a third set of 7 field pixels to horizontal downscale by 6 circuit 220-10. The first set of 7 field pixels includes the pixel whose slope is currently being determined and the three field pixels on both sides of this field pixel. The second set of 7 field pixels includes the field pixel in the line above the field pixel whose slope is being determined that is positioned at a −18.4 degree angle relative to the field pixel whose slope is currently being determined and the three field pixels on both sides of this field pixel. The third set of 7 field pixels includes the field pixel in the line below the field pixel whose slope is being determined that is positioned at a −18.4 degree angle relative to the field pixel whose slope is currently being determined and the three field pixels on both sides of this field pixel. For example, if field pixel FP2,9 is the field pixel whose slope is currently being determined, pre-processor circuit 210-10 outputs the 8-bit luma components of field pixels FP2,6, FP2,7, FP2,8, FP2,9, FP2,10, FP2,11, and FP2,12 (i.e., the first set of 7 field pixels), and the 8-bit luma components of field pixels FP1,0, FP1,1, FP1,2, FP 1,3, FP1,4, FP1,5, and FP1,6 (i.e., the second set of 7 field pixels), and the 8-bit luma components of field pixels FP3,12, FP3,13, FP3,14, FP3,15, FP3,16, FP3,17, and FP3,18 (i.e., the third set of 7 pixels).

Those of ordinary skill in the art will recognize that many different circuits can be used to perform the functions performed by pre-processor circuits 210 and that all such circuits are within the scope of the present invention. Furthermore, those of ordinary skill in the art will recognize that diagonal interpolator circuit 200 can be modified so that some or all of the functions performed by pre-processor circuits 210 can be preformed by other circuits within diagonal interpolator circuit 200 and that all such modifications are within the scope of the present invention.

Horizontal Downscale Circuits

Horizontal downscale circuits 220 each receive respective sets of field pixels from pre-processor circuits 210. Each horizontal downscale circuit 220 downscales its respective sets of field pixels to generate a first downscaled field pixel, a second downscaled field pixel, and a third downscaled field pixel. By downscaling the sets of field pixels, which include diagonal field pixels, before providing them to respective edge detector circuits 230, the edge detector circuits 230 are more likely to correctly detect diagonal edges.

Horizontal downscale by 2 circuit 220-5 is coupled to receive the first set of 3 field pixels, the second set of 3 field pixels, and the third set of 3 pixels from +45 degree pre-processor circuit 210-5. Horizontal downscale by 2 circuit 220-5 downscales the first set of 3 field pixels by 2 to generate a first downscaled field pixel, downscales the second set of 3 field pixels by 2 to generate a second downscaled field pixel, and downscales the third set of 3 field pixels by 2 to generate a third downscaled field pixel. Horizontal downscale by 2 circuit 220-5 then outputs the first downscaled field pixel, the second downscaled field pixel, and the third downscaled field pixel. The downscaling operation can be performed by averaging the first set of 3 field pixels to generate the first downscaled field pixel, averaging the second set of 3 field pixels to generate the second downscaled field pixel, and averaging the third set of 3 field pixels to generate the third downscaled field pixel. The averaging operation can be performed using any suitable low-pass filter such as a [¼, ½, ¼] low-pass filter. The downscaling operation in effect compresses the field lines in the horizontal direction, which filters out noise and thus enables a shallow +45 degree edge to be detected with greater accuracy.

For example, if field pixel FP2,9 is the field pixel whose slope is currently being determined, pre-processor circuit 210-5 outputs the 8-bit luma components of field pixels FP2,8, FP2,9, and FP2,10 (i.e., the first set of 3 field pixels), the 8-bit luma components of field pixels FP1,10, FP1,11, and FP1,12 (i.e., the second set of 3 field pixels), and the 8-bit luma components of field pixels FP3,6, FP3,7, and FP3,8 (i.e., the third set of 3 field pixels). Horizontal downscale by 2 circuit 220-5 downscales the 8-bit luma components of field pixels FP2,8, FP2,9, and FP2,10 by 2 to generate a first 8-bit downscaled field pixel, downscales the 8-bit luma components of field pixels FP1,10, FP1,11, and FP1,12 by 2 to generate a second 8-bit downscaled field pixel, and downscales the 8-bit luma components of field pixels FP3,6, FP3,7, and FP3,8 by 2 to generate a third 8-bit downscaled field pixel.

Horizontal downscale by 2 circuit 220-6 is coupled to receive the first set of 3 field pixels, the second set of 3 field pixels, and the third set of 3 pixels from −45 degree pre-processor circuit 210-6. Horizontal downscale by 2 circuit 220-6 downscales the first set of 3 field pixels by 2 to generate a first downscaled field pixel, downscales the second set of 3 field pixels by 2 to generate a second downscaled field pixel, and downscales the third set of 3 field pixels by 2 to generate a third downscaled field pixel.

Horizontal downscale by 2 circuit 220-6 then outputs the first downscaled field pixel, the second downscaled field pixel, and the third downscaled field pixel. The downscaling operation can be performed by averaging the first set of 3 field pixels to generate the first downscaled field pixel, averaging the second set of 3 field pixels to generate the second downscaled field pixel, and averaging the third set of 3 field pixels to generate the third downscaled field pixel. The averaging operation can be performed using any suitable low-pass filter such as a [¼, ½, ¼] low-pass filter. The downscaling operation in effect compresses the field lines in the horizontal direction, which filters out noise and thus enables a shallow −45 degree edge to be detected with greater accuracy.

For example, if field pixel FP2,9 is the field pixel whose slope is currently being determined, pre-processor circuit 210-6 outputs the 8-bit luma components of field pixels FP2,8, FP2,9, and FP2,10 (i.e., the first set of 3 field pixels), the 8-bit luma components of field pixels FP1,6, FP1,7, and FP1,8 (i.e., the second set of 3 field pixels), and the 8-bit luma components of field pixels FP3,10, FP3,11, and FP3,12 (i.e., the third set of 3 field pixels). Horizontal downscale by 2 circuit 220-6 downscales the 8-bit luma components of field pixels FP2,8, FP2,9, and FP2,10 by 2 to generate a first 8-bit downscaled field pixel, downscales the 8-bit luma components of field pixels FP1,6, FP1,7, and FP1,8 by 2 to generate a second 8-bit downscaled field pixel, and downscales the 8-bit luma components of field pixels FP3,10, FP3,11, and FP3,12 by 2 to generate a third 8-bit downscaled field pixel.

Horizontal downscale by 4 circuit 220-7 is coupled to receive the first set of 5 field pixels, the second set of 5 field pixels, and the third set of 5 pixels from +26.6 degree pre-processor circuit 210-7. Horizontal downscale by 4 circuit 220-7 downscales the first set of 5 field pixels by 4 to generate a first downscaled field pixel, downscales the second set of 5 field pixels by 4 to generate a second downscaled field pixel, and downscales the third set of 5 field pixels by 4 to generate a third downscaled field pixel. Horizontal downscale by 4 circuit 220-7 then outputs the first downscaled field pixel, the second downscaled field pixel, and the third downscaled field pixel. The downscaling operation can be performed by averaging the first set of 5 field pixels to generate the first downscaled field pixel, averaging the second set of 5 field pixels to generate the second downscaled field pixel, and averaging the third set of 5 field pixels to generate the third downscaled field pixel. The averaging operation can be performed using any suitable low-pass filter such as a [¹⁄₁₆, ¼, ⅜, ¼, ¹⁄₁₆] low-pass filter. The downscaling operation in effect compresses the field lines in the horizontal direction, which filters out noise and thus enables a shallow +26.6 degree edge to be detected with greater accuracy.

For example, if field pixel FP2,9 is the field pixel whose slope is currently being determined, pre-processor circuit 210-7 outputs the 8-bit luma components of field pixels FP2,7, FP2,8, FP2,9, FP2,10, and FP2,11 (i.e., the first set of 5 field pixels), the 8-bit luma components of field pixels FP1, 11, FP1,12, FP1,13, FP1,14, and FP1,15 (i.e., the second set of 5 field), and the 8-bit luma components of field pixels FP3,3, FP3,4, FP3,5, FP3,6, and FP3,7 (i.e., the third set of 5 field pixels). Horizontal downscale by 4 circuit 220-7 downscales the 8-bit luma components of field pixels FP2,7, FP2,8, FP2,9, FP2,10, and FP2,11 by 4 to generate a first 8-bit downscaled field pixel, downscales the 8-bit luma components of field pixels FP1,11, FP1,12, FP1,13, FP1,14, and FP1,15 by 4 to generate a second 8-bit downscaled field pixel, and downscales the 8-bit luma components of field pixels FP3,3, FP3,4, FP3,5, FP3,6, and FP3,7 by 4 to generate a third 8-bit downscaled field pixel.

Horizontal downscale by 4 circuit 220-8 is coupled to receive the first set of 5 field pixels, the second set of 5 field pixels, and the third set of 5 pixels from −26.6 degree pre-processor circuit 210-8. Horizontal downscale by 4 circuit 220-8 downscales the first set of 5 field pixels by 4 to generate a first downscaled field pixel, downscales the second set of 5 field pixels by 4 to generate a second downscaled field pixel, and downscales the third set of 5 field pixels by 4 to generate a third downscaled field pixel. Horizontal downscale by 4 circuit 220-8 then outputs the first downscaled field pixel, the second downscaled field pixel, and the third downscaled field pixel. The downscaling operation can be performed by averaging the first set of 5 field pixels to generate the first downscaled field pixel, averaging the second set of 5 field pixels to generate the second downscaled field pixel, and averaging the third set of 5 field pixels to generate the third downscaled field pixel. The averaging operation can be performed using any suitable low-pass filter such as a [¹⁄₁₆, ¼, ⅜, ¼, ¹⁄₁₆] low-pass filter. The downscaling operation in effect compresses the field lines in the horizontal direction, which filters out noise and thus enables a shallow −26.6 degree edge to be detected with greater accuracy.

For example, if field pixel FP2,9 is the field pixel whose slope is currently being determined, pre-processor circuit 210-8 outputs the 8-bit luma components of field pixels FP2,7, FP2,8, FP2,9, FP2,10, and FP2,11 (i.e., the first set of 5 field pixels), the 8-bit luma components of field pixels FP1,3, FP1,4, FP1,5, FP1,6, and FP1,7 (i.e., the second set of 5 field pixels) and the 8-bit luma components of field pixels FP3,11, FP3,12, FP3,13, FP3,14, and FP3,15 (i.e., the third set of 5 field pixels). Horizontal downscale by 4 circuit 220-8 downscales the 8-bit luma components of field pixels FP2,7, FP2,8, FP2,9, FP2,10, and FP2,11 by 4 to generate a first 8-bit downscaled field pixel, downscales the 8-bit luma components of field pixels FP1,3, FP1,4, FP1,5, FP1,6, and FP1,7 by 4 to generate a second 8-bit downscaled field pixel, and downscales the 8-bit luma components of field pixels FP3,11, FP3,12, FP3,13, FP3,14, and FP3,15 by 4 to generate a third 8-bit downscaled field pixel.

Horizontal downscale by 6 circuit 220-9 is coupled to receive the first set of 7 field pixels, the second set of 7 field pixels, and the third set of 7 pixels from +18.4 degree pre-processor circuit 210-9. Horizontal downscale by 6 circuit 220-9 downscales the first set of 7 field pixels by 6 to generate a first downscaled field pixel, downscales the second set of 7 field pixels by 6 to generate a second downscaled field pixel, and downscales the third set of 7 field pixels by 6 to generate a third downscaled field pixel. Horizontal downscale by 6 circuit 220-9 then outputs the first downscaled field pixel, the second downscaled field pixel, and the third downscaled field pixel. The downscaling operation can be performed by averaging the first set of 7 field pixels to generate the first downscaled field pixel, averaging the second set of 7 field pixels to generate the second downscaled field pixel, and averaging the third set of 7 field pixels to generate the third downscaled field pixel. The averaging operation can be performed using any suitable low-pass filter such as a [¹⁄₆₄, ³⁄₃₂, ¹⁵⁄₆₄, ⁵⁄₁₆, ¹⁵⁄₆₄, ³⁄₃₂, ¹⁄₆₄] low-pass filter. The downscaling operation in effect compresses the field lines in the horizontal direction, which filters out noise and thus enables a shallow +18.4 degree edge to be detected with greater accuracy.

For example, if field pixel FP2,9 is the field pixel whose slope is currently being determined, pre-processor circuit 210-9 outputs the 8-bit luma components of field pixels FP2,6, FP2,7, FP2,8, FP2,9, FP2,10, FP2,11, and FP2,12 (i.e., the first set of 7 field pixels), the 8-bit luma components of field pixels FP1,12, FP1,13, FP 1,14, FP1,15, FP1,16, FP1,17, and FP1,18 (i.e., the second set of 7 field pixels), and the 8-bit luma components of field pixels FP3,0, FP3,1, FP3,2, FP3,3, FP3,4, FP3,5, and FP3,6 (i.e., the third set of 7 field pixels). Horizontal downscale by 6 circuit 220-9 downscales the 8-bit luma components of field pixels FP2,6, FP2,7, FP2,8, FP2,9, FP2,10, FP2,11, and FP2,12 by 6 to generate a first 8-bit downscaled field pixel, downscales the 8-bit luma components of field pixels FP1,12, FP1,13, FP1,14, FP1,15, FP1,16, FP1,17, and FP1,18 by 6 to generate a second 8-bit downscaled field pixel, and downscales the 8-bit luma components of field pixels FP3,0, FP3,1, FP3,2, FP3,3, FP3,4, FP3,5, and FP3,6 by 6 to generate a third 8-bit downscaled field pixel.

Horizontal downscale by 6 circuit 220-10 is coupled to receive the first set of 7 field pixels, the second set of 7 field pixels, and the third set of 7 pixels from −18.4 degree pre-processor circuit 210-10. Horizontal downscale by 6 circuit 220- 10 downscales the first set of 7 field pixels by 6 to generate a first downscaled field pixel, downscales the second set of 7 field pixels by 6 to generate a second downscaled field pixel, and downscales the third set of 7 field pixels by 6 to generate a third downscaled field pixel. Horizontal downscale by 6 circuit 220-10 then outputs the first downscaled field pixel, the second downscaled field pixel, and the third downscaled field pixel. The downscaling operation can be performed by averaging the first set of 7 field pixels to generate the first downscaled field pixel, averaging the second set of 7 field pixels to generate the second downscaled field pixel, and averaging the third set of 7 field pixels to generate the third downscaled field pixel. The averaging operation can be performed using any suitable low-pass filter such as a [1/64, 3/32, 15/64, 5/16, 15/64, 3/32, 1/64] low-pass filter. The downscaling operation in effect compresses the field lines in the horizontal direction, which filters out noise and thus enables a shallow −18.4 degree edge to be detected with greater accuracy.

For example, if field pixel FP2,9 is the field pixel whose slope is currently being determined, pre-processor circuit 210-10 outputs the 8-bit luma components of field pixels FP2,6, FP2,7, FP2,8, FP2,9, FP2,10, FP2,11, and FP2,12 (i.e., the first set of 7 field pixels), and the 8-bit luma components of field pixels FP1,0, FP1,1, FP1,2, FP1,3, FP1,4, FP1,5, and FP1,6 (i.e., the second set of 7 field pixels), and the 8-bit luma components of field pixels FP3,12, FP3,13, FP3,14, FP3,15, FP3,16, FP3,17, and FP3, 18 (i.e., the third set of 7 pixels). Horizontal downscale by 6 circuit 220-10 downscales the 8-bit luma components of field pixels FP2,6, FP2,7, FP2,8, FP2,9, FP2,10, FP2,11, and FP2,12 by 6 to generate a first 8-bit downscaled field pixel, downscales the 8-bit luma components of field pixels FP1,0, FP1,1, FP1,2, FP1,3, FP1,4, FP1,5, and FP1,6 by 6 to generate a second 8-bit downscaled field pixel, and downscales the 8-bit luma components of field pixels FP3,12, FP3,13, FP3,14, FP3,15, FP3,16, FP3,17, and FP3,18 by 6 to generate a third 8-bit downscaled field pixel.

Those of ordinary skill in the art will recognize that many different circuits can be used to perform the functions performed by horizontal downscale circuits 220 and that all such circuits are within the scope of the present invention. Furthermore, those of ordinary skill in the art will recognize that diagonal interpolator circuit 200 can be modified so that some or all of the functions performed by downscale circuits 220 can be performed by other circuits within diagonal interpolator circuit 200 and that all such modifications are within the scope of the present invention.

Edge Detector Circuits 0 degree edge detector circuit 230-1 receives 3 field pixels from 0 degree pre-processor circuit 210-1. The 3 field pixels include the field pixel whose slope is currently being determined and the two field pixels that are positioned at a 0 degree angle relative to the field pixel whose slope is currently being determined. 0 degree edge detector circuit 230-1 filters the 3 field pixels using a high-pass filter, such as a [−¼, ½, −¼] high-pass filter. The high-pass filter outputs a value that is then compared with a programmable threshold value. If the value is below the threshold value, then 0 degree edge detector circuit 230-1 outputs a value indicating that a 0 degree edge has been detected. If the value is not below the programmable threshold value, then 0 degree edge detector circuit 230-1 outputs a value indicating that a 0 degree edge has not been detected. For example, if field pixel FP2,9 is the field pixel whose slope is currently being determined, edge detector circuit 230-1 filters field pixels FP2,8, FP2,9, and FP2,10 using a high pass-filter, compares the output value of the high-pass filter with a programmable threshold value, and outputs a value indicating whether or not the slope of field pixel FP2,9 is 0 degrees.

90 degree edge detector circuit 230-2 receives 3 field pixels from 90 degree pre-processor circuit 210-2. The 3 field pixels include the field pixel whose slope is currently being determined and the two field pixels that are positioned at a 90 degree angle relative to the field pixel whose slope is currently being determined. 90 degree edge detector circuit 230-2 filters the 3 field pixels using a high-pass filter, such as a [−¼, ½, −¼] high-pass filter. The high-pass filter outputs a value that is then compared with a programmable threshold value. If the value is below the threshold value, then 90 degree edge detector circuit 230-2 outputs a value indicating that a 90 degree edge has been detected. If the value is not below the programmable threshold value, then 90 degree edge detector circuit 230-2 outputs a value indicating that a 90 degree edge has not been detected. For example, if field pixel FP2,9 is the field pixel whose slope is currently being determined, edge detector circuit 230-2 filters field pixels FP1,9, FP2,9, and FP3,9 using a high pass-filter, compares the output value of the high-pass filter with a programmable threshold value, and outputs a value indicating whether or not the slope of field pixel FP2,9 is 90 degrees.

+63.4 degree edge detector circuit 230-3 receives 3 field pixels from +63.4 degree pre-processor circuit 210-3. The 3 field pixels include the field pixel whose slope is currently being determined and the two field pixels that are positioned at a +63.4 degree angle relative to the field pixel whose slope is currently being determined. +63.4 degree edge detector circuit 230-3 filters the 3 field pixels using a high-pass filter, such as a [−¼, ½,−¼] high-pass filter. The high-pass filter outputs a value that is then compared with a programmable threshold value. If the value is below the threshold value, then +63.4 degree edge detector circuit 230-3 outputs a value indicating that a +63.4 degree edge has been detected. If the value is not below the programmable threshold value, then +63.4 degree edge detector circuit 230-3 outputs a value indicating that a +63.4 degree edge has not been detected. For example, if field pixel FP2,9 is the field pixel whose slope is currently being determined, edge detector circuit 230-3 filters field pixels FP1,10, FP2,9, and FP3,8 using a high pass-filter, compares the output value of the high-pass filter with a programmable threshold value, and outputs a value indicating whether or not the slope of field pixel FP2,9 is +63.4 degrees.

−63.4 degree edge detector circuit 230-4 receives 3 field pixels from −63.4 degree pre-processor circuit 210-4. The 3 field pixels include the field pixel whose slope is currently being determined and the two field pixels that are positioned at a 63.4 degree angle relative to the field pixel whose slope is currently being determined. −63.4 degree edge detector circuit 230-4 filters the 3 field pixels using a high-pass filter, such as a [−¼, ½, −¼] high-pass filter. The high-pass filter outputs a value that is then compared with a programmable threshold value. If the value is below the threshold value, then −63.4 degree edge detector circuit 230-4 outputs a value indicating that a −63.4 degree edge has been detected. If the value is not below the programmable threshold value, then −63.4 degree edge detector circuit 230-4 outputs a value indicating that a −63.4 degree edge has not been detected. For example, if field pixel FP2,9 is the field pixel whose slope is currently being determined, edge detector circuit 230-4 filters field pixels FP1,8, FP2,9, and FP3,10 using a high pass-filter, compares the output value of the high-pass filter with a programmable threshold value, and outputs a value indicating whether or not the slope of field pixel FP2,9 is −63.4 degrees.

+63.4 (+45) degree edge detector circuit 230-5 receives 3 downscaled field pixels from horizontal downscale by 2 circuit 220-5. The 3 downscaled field pixels include the first downscaled field pixel, the second downscaled field pixel, and the third downscaled field pixel. +63.4 (+45) degree edge detector circuit 230-5 filters the 3 downscaled field pixels using a high-pass filter, such as a [−¼, ½, −¼] high-pass filter. The high-pass filter outputs a value that is then compared with a programmable threshold value. If the value is below the threshold value, then +63.4 (+45) degree edge detector circuit 230-5 outputs a value indicating that a +45 degree edge has been detected. If the value is not below the programmable threshold value, then +63.4 (+45) degree edge detector circuit 230-5 outputs a value indicating that a +45 degree edge has not been detected. For example, if field pixel FP2,9 is the field pixel whose slope is currently being determined, +63.4 (+45) degree edge detector circuit 230-5 filters the 3 downscaled field pixels received from horizontal downscale by 2 circuit 220-5 using a high pass-filter, compares the output value of the high-pass filter with a programmable threshold value, and outputs a value indicating whether or not the slope of field pixel FP2,9 is +45 degrees.

Note that by downscaling the field pixels on the shallow +45 degree diagonal, a +63.4 degree edge detector circuit (which is much more reliable than a +45 degree edge detector circuit) can be used to detect a +45 degree edge. As a result, the edge detection process is much more likely to produce an accurate slope value for the field pixel whose slope is currently being determined.

−63.4 (−45) degree edge detector circuit 230-6 receives 3 downscaled field pixels from horizontal downscale by 2 circuit 220-6. The 3 downscaled field pixels include the first downscaled field pixel, the second downscaled field pixel, and the third downscaled field pixel. −63.4 (−45) degree edge detector circuit 230-6 filters the 3 downscaled field pixels using a high-pass filter, such as a [−¼, ½, −¼] high-pass filter. The high-pass filter outputs a value that is then compared with a programmable threshold value. If the value is below the threshold value, then −63.4 (−45) degree edge detector circuit 230-6 outputs a value indicating that a −45 degree edge has been detected. If the value is not below the programmable threshold value, then −63.4 (−45) degree edge detector circuit 230-6 outputs a value indicating that a −45 degree edge has not been detected. For example, if field pixel FP2,9 is the field pixel whose slope is currently being determined, −63.4 (−45) degree edge detector circuit 230-6 filters the 3 downscaled field pixels received from horizontal downscale by 2 circuit 220-6 using a high pass-filter, compares the output value of the high-pass filter with a programmable threshold value, and outputs a value indicating whether or not the slope of field pixel FP2,9 is −45 degrees.

Note that by downscaling the field pixels on the shallow −45 degree diagonal, a −63.4 degree edge detector circuit (which is much more reliable than a −45 degree edge detector circuit) can be used to detect a −45 degree edge. As a result, the edge detection process is much more likely to produce an accurate slope value for the field pixel whose slope is currently being determined.

+63.4 (+26.6) degree edge detector circuit 230-7 receives 3 downscaled field pixels from horizontal downscale by 4 circuit 220-7. The 3 downscaled field pixels include the first downscaled field pixel, the second downscaled field pixel, and the third downscaled field pixel. +63.4 (+26.6) degree edge detector circuit 230-7 filters the 3 downscaled field pixels using a high-pass filter, such as a [−¼, ½, −¼] high-pass filter. The high-pass filter outputs a value that is then compared with a programmable threshold value. If the value is below the threshold value, then +63.4 (+26.6) degree edge detector circuit 230-7 outputs a value indicating that a +26.6 degree edge has been detected. If the value is not below the programmable threshold value, then +63.4 (+26.6) degree edge detector circuit 230-7 outputs a value indicating that a +26.6 degree edge has not been detected. For example, if field pixel FP2,9 is the field pixel whose slope is currently being determined, +63.4 (+26.6) degree edge detector circuit 230-7 filters the 3 downscaled field pixels received from horizontal downscale by 4 circuit 220-7 using a high pass-filter, compares the output value of the high-pass filter with a programmable threshold value, and outputs a value indicating whether or not the slope of field pixel FP2,9 is +26.6 degrees.

Note that by downscaling the field pixels on the shallow +26.6 degree diagonal, a +63.4 degree edge detector circuit (which is much more reliable than a +26.6 degree edge detector circuit) can be used to detect a +26.6 degree edge. As a result, the edge detection process is much more likely to produce an accurate slope value for the field pixel whose slope is currently being determined.

−63.4 (−26.6) degree edge detector circuit 230-8 receives 3 downscaled field pixels from horizontal downscale by 4 circuit 220-8. The 3 downscaled field pixels include the first downscaled field pixel, the second downscaled field pixel, and the third downscaled field pixel. −63.4 (−26.6) degree edge detector circuit 230-8 filters the 3 downscaled field pixels using a high-pass filter, such as a [−¼, ½, −¼] high-pass filter. The high-pass filter outputs a value that is then compared with a programmable threshold value. If the value is below the threshold value, then −63.4 (−26.6) degree edge detector circuit 230-8 outputs a value indicating that a −26.6 degree edge has been detected. If the value is not below the programmable threshold value, then −63.4 (−26.6) degree edge detector circuit 230-8 outputs a value indicating that a −26.6 degree edge has not been detected. For example, if field pixel FP2,9 is the field pixel whose slope is currently being determined, −63.4 (−26.6) degree edge detector circuit 230-8 filters the 3 downscaled field pixels received from horizontal downscale by 4 circuit 220-8 using a high pass-filter, compares the output value of the high-pass filter with a programmable threshold value, and outputs a value indicating whether or not the slope of field pixel FP2,9 is −26.6 degrees.

Note that by downscaling the field pixels on the shallow −26.6 degree diagonal, a −63.4 degree edge detector circuit (which is much more reliable than a −26.6 degree edge detector circuit) can be used to detect a −26.6 degree edge. As a result, the edge detection process is much more likely to produce an accurate slope value for the field pixel whose slope is currently being determined.

+63.4 (+18.4) degree edge detector circuit 230-9 receives 3 downscaled field pixels from horizontal downscale by 6 circuit 220-9. The 3 downscaled field pixels include the first downscaled field pixel, the second downscaled field pixel, and the third downscaled field pixel. +63.4 (+18.4) degree edge detector circuit 230-9 filters the 3 downscaled field pixels using a high-pass filter, such as a [−¼, ½, −¼] high-pass filter. The high-pass filter outputs a value that is then compared with a programmable threshold value. If the value is below the threshold value, then +63.4 (+18.4) degree edge detector circuit 230-9 outputs a value indicating that a +18.4 degree edge has been detected. If the value is not below the programmable threshold value, then +63.4 (+18.4) degree edge detector circuit 230-9 outputs a value indicating that a +18.4 degree edge has not been detected. For example, if field pixel FP2,9 is the field pixel whose slope is currently being determined, +63.4 (+18.4) degree edge detector circuit 230-9 filters the 3 downscaled field pixels received from horizontal downscale by 6 circuit 220-9 using a high pass-filter, compares the output value of the high-pass filter with a programmable threshold value, and outputs a value indicating whether or not the slope of field pixel FP2,9 is +18.4 degrees.

Note that by downscaling the field pixels on the shallow +18.4 degree diagonal, a +63.4 degree edge detector circuit (which is much more reliable than a +18.4 degree edge detector circuit) can be used to detect a +18.4 degree edge. As a result, the edge detection process is much more likely to produce an accurate slope value for the field pixel whose slope is currently being determined.

−63.4 (−18.4) degree edge detector circuit 230-10 receives 3 downscaled field pixels from horizontal downscale by 6 circuit 220-10. The 3 downscaled field pixels include the first downscaled field pixel, the second downscaled field pixel, and the third downscaled field pixel. −63.4 (−18.4) degree edge detector circuit 230-10 filters the 3 downscaled field pixels using a high-pass filter, such as a [−¼, ½, −¼] high-pass filter. The high-pass filter outputs a value that is then compared with a programmable threshold value. If the value is below the threshold value, then −63.4 (18.4) degree edge detector circuit 230-10 outputs a value indicating that a −18.4 degree edge has been detected. If the value is not below the programmable threshold value, then −63.4 (−18.4) degree edge detector circuit 230-10 outputs a value indicating that a 18.4 degree edge has not been detected. For example, if field pixel FP2,9 is the field pixel whose slope is currently being determined, −63.4 (−18.4) degree edge detector circuit 230-10 filters the 3 downscaled field pixels received from horizontal downscale by 6 circuit 220-10 using a high pass-filter, compares the output value of the high-pass filter with a programmable threshold value, and outputs a value indicating whether or not the slope of field pixel FP2,9 is −18.4 degrees.

Note that by downscaling the field pixels on the shallow −18.4 degree diagonal, a −63.4 degree edge detector circuit (which is much more reliable than a −18.4 degree edge detector circuit) can be used to detect a −18.4 degree edge. As a result, the edge detection process is much more likely to produce an accurate slope value for the field pixel whose slope is currently being determined.

Those of ordinary skill in the art will recognize that many different circuits can be used to perform the functions performed by edge detector circuits 230 and that all such circuits are within the scope of the present invention. Furthermore, those of ordinary skill in the art will recognize that diagonal interpolator circuit 200 can be modified so that some or all of the functions performed by edge detector circuits 230 can be preformed by other circuits within diagonal interpolator circuit 200 and that all such modifications are within the scope of the present invention.

Field Pixel Slope Determinator Circuit

Field pixel slope determinator circuit 240 receives the values output by each edge detector circuit 230 and, based on these values, determines the slope of the field pixel whose slope is currently being determined. Field pixel slope determinator circuit 240 determines the slope of the field pixel whose slope is currently being determined according to one of the following four cases.

In the first case, none of the edge detector circuits 230 output a valid value. This case indicates that there are no edges that traverse the field pixel whose slope is currently being determined. Accordingly, field pixel slope determinator circuit 240 outputs a no-slope or undetermined slope value.

In the second case, one of the edge detector circuits 230 outputs a valid value, while the other edge detector circuits 230 output invalid values. This case indicates that there is one edge that traverses the field pixel whose slope is currently being determined. In this case, field pixel slope determinator circuit 240 outputs a slope value corresponding to the slope of this detected edge.

In the third case, multiple edge detector circuits 230 output a valid value, and each of these edge detector circuits 230 indicate an edge having the same slope direction (i.e., all are positive or all are negative). This case indicates that there is an edge that that traverses the field pixel and that the direction of the edge is known, but the slope of the edge is uncertain. In this case, field pixel slope determinator circuit 240 outputs a slope value which corresponds to the steepest slope that has a valid value.

In the fourth case, multiple edge detector circuits 230 output a valid value, but at least two of these edge detector circuits 230 indicate edges having opposite slope directions (i.e., at least one output value indicates a positive slope direction and at least one output value indicates a negative slope direction). This case indicates that there is an edge that that traverses the field pixel, but that the direction of the slope is uncertain. In this case, due to the uncertainty of the slope direction, the slope of the field pixel is determined using a conventional vertical interpolated technique.

Field pixel slope determinator circuit 240 may also include circuitry that does not assign a shallow slope value to a field pixel until a high level of confidence in the detected slope has been achieved. To accomplish this, field pixel slope determinator circuit 240 can utilize the following technique. If a 90 degree slope value, a 63.4 degree slope value, or a 45 degree slope value is detected for a field pixel, then the field pixel is assigned this slope value. If a +26.6 or −26.6 degree slope value is detected for a field pixel, then the field pixel is only assigned this value if the field pixel to its left or to its right has the same detected slope value. In other words, two consecutive field pixels must have a +26.6 or −26.6 degree slope value before either field pixel is assigned this slope value. If a +18.4 or −18.4 degree slope value is detected for a field pixel, then the field pixel is only assigned this value if the field pixel to its left and to its right has the same detected slope value. In other words, three consecutive field pixels must have a +18.4 or −18.4 degree slope value before any of the three field pixels is assigned this slope value.

Those of ordinary skill in the art will recognize that many different circuits can be used to perform the functions performed by field pixel slope determinator circuit 240 and that all such circuits are within the scope of the present invention. Furthermore, those of ordinary skill in the art will recognize that diagonal interpolator circuit 200 can be modified so that some or all of the functions performed by field pixel slope determinator circuit 240 can be preformed by other circuits within diagonal interpolator circuit 200 and that all such modifications are within the scope of the present invention.

Interpolated Pixel Slope Determinator Circuit

Interpolated pixel slope determinator circuit 250 is coupled to receive the slope value for the pixel whose slope is currently being determined from field pixel slope determinator circuit 240. Interpolated pixel slope determinator circuit 250 stores the slope values for each pixel whose slope has been determined as those slope values are received from field pixel slope determinator circuit 240. For example, interpolated pixel slope determinator circuit 250 receives and stores slope values for FP2,0, FP2,1, . . . , FP2,17, FP2,18, FP3,0, FP3,1 . . . , FP2,17, FP2,18, and so on.

Once the slope values for the field pixels that surround an interpolated pixel have been received, interpolated pixel slope determinator circuit 250 uses the slope values of the surrounding field pixels to determine the slope of the interpolated pixel. Typically, interpolated pixel slope determinator circuit 250 will examine a set of vertical field pixels and multiple sets of diagonal field pixels to determine which set (if any) indicates a horizontal, a vertical, or a diagonal edge. If none of the sets indicate an edge, interpolated pixel slope determinator 250 does not assign a slope to the interpolated pixel and outputs a no slope or undetermined slope value. If one of the sets indicates an edge, interpolated pixel slope determinator 250 assigns the slope of this edge to the interpolated pixel and outputs this slope value.

Those of ordinary skill in the art will recognize that many different circuits can be used to perform the functions performed by interpolated pixel slope determinator circuit 250 and that all such circuits are within the scope of the present invention. Furthermore, those of ordinary skill in the art will recognize that diagonal interpolator circuit 200 can be modified so that some or all of the functions performed by interpolated pixel slope determinator circuit 250 can be preformed by other circuits within diagonal interpolator circuit 200 and that all such modifications are within the scope of the present invention.

Interpolated Pixel Generator Circuit

Interpolated pixel generator circuit 260 is coupled to receive the slope value of an interpolated pixel from interpolated pixel slope determinator circuit 250. Interpolated pixel generator circuit 260 uses the slope value of an interpolated pixel to generate an interpolated pixel. The interpolated pixel can be represented by an 8-bit luma component and/or an 8-bit chroma component. The interpolated pixel is then output from interpolated pixel generator circuit 260 and can be combined with the field pixels of interlaced video signal VS to generate a progressive video signal.

Those of ordinary skill in the art will recognize that many different circuits can be used to perform the functions performed by interpolated pixel slope generator circuit 260 and that all such circuits are within the scope of the present invention. Furthermore, those of ordinary skill in the art will recognize that diagonal interpolator circuit 200 can be modified so that some or all of the functions performed by interpolated pixel slope generator circuit 260 can be preformed by other circuits within diagonal interpolator circuit 200 and that all such modifications are within the scope of the present invention.

Exemplary Applications

Diagonal interpolator circuit 200 can be used in a wide variety of video signal processing applications. In one application, diagonal interpolator circuit 200 is implemented on a single integrated circuit device that is integrated into a digital video disk (DVD) player and thus enables the DVD player to convert an interlaced video signal into a progressive video signal. In a second application, diagonal interpolator circuit 200 is implemented in software that is used to decode and display MPEG video streams. In a third application, diagonal interpolator circuit 200 is implemented on a single integrated circuit device that is integrated into a flat-panel (LCD) controller device. In a fourth application, diagonal interpolator circuit 200 is implemented on a single integrated circuit device that is integrated into a progressive scan television. In a fifth application, diagonal interpolator circuit 200 is implemented on a single integrated circuit device that is integrated into a high-definition television (HDTV). Diagonal interpolator circuit 200 can also be used in any application that requires scaling (enlarging) any type of image.

Alternative Embodiments

Those of ordinary skill in the art will recognize that numerous modifications, all of which are within the scope of the present invention, can be made to diagonal interpolator circuit 200 including the following modifications. First, the present invention can be modified so that even shallower diagonals (e.g., lower than +18.4 and −18.4 degrees) are detected and used when generating an interpolated pixel. Second, the present invention can be modified so that any number of field pixels from any number of lines above and/or below the field pixel whose slope is currently being determined can be used to determined the slope of the a field pixel whose slope is currently being determined. Third, the present invention can be modified so that angles such as 33.7 degrees and 21.8 degrees are detected and used when generating an interpolated pixel. Fourth, the present invention can be modified so that the high-pass filters precede the downscale circuits. Fifth, the present invention can be modified so that a field buffer can be used to store the detected slopes; these stored slopes can then be used to determine the interpolation slope for the next field.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

What is claimed is:

1. A circuit for pixel interpolation, the circuit comprising:
   a plurality of downscale circuits, each downscale circuit coupled to receive one or more sets of field pixels of a video signal, and each downscale circuit operable to generate one or more downscaled field pixels from the one or more sets of field pixels;
   a plurality of edge detector circuits, each edge detector circuit coupled to receive one or more downscaled field pixels from a respective downscale circuit and operable to detect corresponding edges therefrom;
   a field pixel slope determinator coupled to received the output of the plurality of edge detection circuits and determine field pixel slopes therefrom;
   an interpolated pixel slope determinator coupled to receive the field pixel slopes and determine an interpolated pixel slope therefrom; and
   an interpolated pixel generator coupled to receive the interpolated pixel slope and generate an interpolated pixel based thereupon.

2. The circuit of claim 1, wherein said video signal is an interlaced video signal.

3. The circuit of claim 1 wherein the one or more sets of field pixels include a first set of field pixels, the first set of field pixels including field pixels from a field line having the first field pixel.

4. The circuit of claim 1 wherein the one or more sets of field pixels include a second set of field pixels, the second set of field pixels including field pixels from a field line above a field line having the first field pixel.

5. The circuit of claim 1 wherein the one or more sets of field pixels include a third set of field pixels, the third set of field pixels including field pixels from a field line below a field line having the first field pixel.

6. The circuit of claim 1 wherein each downscale circuit averages a first set of field pixels, the first set of field pixels including at least 3 field pixels from a field line having the first field pixel.

7. The circuit of claim 1 wherein each downscale circuit averages a second set of field pixels, the second set of field pixels including at least 3 field pixels from a field line above a field line having the first field pixel.

8. The circuit of claim 1 wherein each downscale circuit averages a third set of field pixels, the third set of field pixels including at least 3 field pixels from a field line below a field line having the first field pixel.

9. The circuit of claim 1 wherein each downscale circuit low-pass filters a first set of field pixels, the first set of field pixels including at least 3 field pixels from a field line having the first field pixel.

10. The circuit of claim 1 wherein each downscale circuit low-pass filters a second set of field pixels, the second set of field pixels including at least 3 field pixels from a field line above a field line having the first field pixel.

11. The circuit of claim 1 wherein each downscale circuit low-pass filters a third set of field pixels, the third set of field pixels including at least 3 field pixels from a field line below a field line having the first field pixel.

12. The circuit of claim 1 wherein each edge detector circuit includes a high-pass filter.

13. The circuit of claim 1 wherein each edge detector circuit includes a $[-\frac{1}{4}, \frac{1}{2}, -\frac{1}{4}]$ high pass filter.

* * * * *